(12) United States Patent
Abrams

(10) Patent No.: US 6,546,947 B2
(45) Date of Patent: Apr. 15, 2003

(54) SAFETY SYSTEM FOR FLUID CONDUIT

(75) Inventor: Joseph H. Abrams, Wynnewood, PA (US)

(73) Assignee: Smart-Hose Technologies, Inc., Philadelphia, PA (US)

( * ) Notice: Subject to any disclaimer, the term of this patent is extended or adjusted under 35 U.S.C. 154(b) by 0 days.

(21) Appl. No.: 09/847,179

(22) Filed: May 2, 2001

(65) Prior Publication Data

US 2002/0007847 A1 Jan. 24, 2002

Related U.S. Application Data

(63) Continuation-in-part of application No. 09/491,164, filed on Jan. 26, 2000, now Pat. No. 6,260,569.

(51) Int. Cl.[7] .......................... F16K 17/36; G01M 3/22
(52) U.S. Cl. .............................. 137/68.14; 137/614.04; 137/312; 138/104; 73/40.5 R
(58) Field of Search .................. 137/68.14, 614.04, 137/312; 138/104, 114; 73/40.5 R, 40.7, 49.1

(56) References Cited

U.S. PATENT DOCUMENTS

| 1,304,364 A |   | 5/1919 | Phillips et al. |
|---|---|---|---|
| 2,054,561 A | * | 9/1936 | Greenberg ............... 137/68.14 |
| 2,165,640 A | * | 7/1939 | Marx ................... 137/68.14 X |
| 3,273,578 A |   | 9/1966 | Clark |
| 3,630,214 A |   | 12/1971 | Levering |
| 3,802,456 A | * | 4/1974 | Wittgenstein ............... 137/312 |
| 3,859,692 A |   | 1/1975 | Waterman et al. |
| 3,907,336 A |   | 9/1975 | Siegmund |
| 3,913,603 A | * | 10/1975 | Torres .................. 137/68.14 X |
| 4,023,584 A | * | 5/1977 | Rogers et al. ........... 137/68.14 |
| 4,098,438 A |   | 7/1978 | Taylor |
| 4,351,351 A | * | 9/1982 | Flory et al. .............. 137/68.14 |
| 4,509,558 A |   | 4/1985 | Slater |
| 4,735,083 A |   | 4/1988 | Tenenbaum |
| 4,827,977 A |   | 5/1989 | Fink, Jr. |
| 4,886,087 A |   | 12/1989 | Kitchen |
| 5,054,523 A |   | 10/1991 | Rink |
| 5,099,870 A | * | 3/1992 | Moore et al. ......... 137/68.14 X |

(List continued on next page.)

*Primary Examiner*—John Rivell
(74) *Attorney, Agent, or Firm*—RatnerPrestia

(57) ABSTRACT

A safety system for a fluid conduit comprising a fluid conduit having first and second ends, a first valve seat in a housing disposed at the first end of the conduit and a second valve seat in a housing disposed at the second end of the flexible fluid conduit. The first and second valve seats are positioned a first predetermined distance from each other. A first valve body is pivotally attached to the first housing at the first end of the flexible fluid conduit and a second valve body is pivotally attached to the second housing at the second end of the fluid conduit. The first and second valve seats are disposed between the first and second plurality of valve bodies, with the first and second valve bodies positioned a second predetermined distance from the first and second valve seats, respectively. A valve control means retains the first and second valve bodies the second predetermined distance from the first and second valve seats, respectively, during an open flow condition, and seats one or both of the first and second valve bodies with the first and second valve seats, respectively, during a fluid conduit failure.

15 Claims, 16 Drawing Sheets

U.S. PATENT DOCUMENTS

| | | |
|---|---|---|
| 5,172,730 A | 12/1992 | Driver |
| 5,305,776 A * | 4/1994 | Romano ................. 137/68.14 |
| 5,343,738 A | 9/1994 | Skaggs |
| 5,351,708 A * | 10/1994 | Donato et al. ........... 137/68.14 |
| 5,357,998 A | 10/1994 | Abrams |
| 5,427,155 A | 6/1995 | Williams |
| 5,497,809 A | 3/1996 | Wolf |
| 5,499,659 A * | 3/1996 | Naf ............................. 138/97 |
| 5,518,034 A | 5/1996 | Ragout et al. |
| 5,531,357 A | 7/1996 | Guilmette |
| 5,551,484 A | 9/1996 | Charboneau |
| 5,654,499 A | 8/1997 | Manuli |
| 5,714,681 A | 2/1998 | Furness et al. |
| 5,803,127 A | 9/1998 | Rains |
| 5,868,170 A | 2/1999 | Spengler |
| 5,931,184 A | 8/1999 | Armenia et al. |
| 6,260,569 B1 | 7/2001 | Abrams |

\* cited by examiner

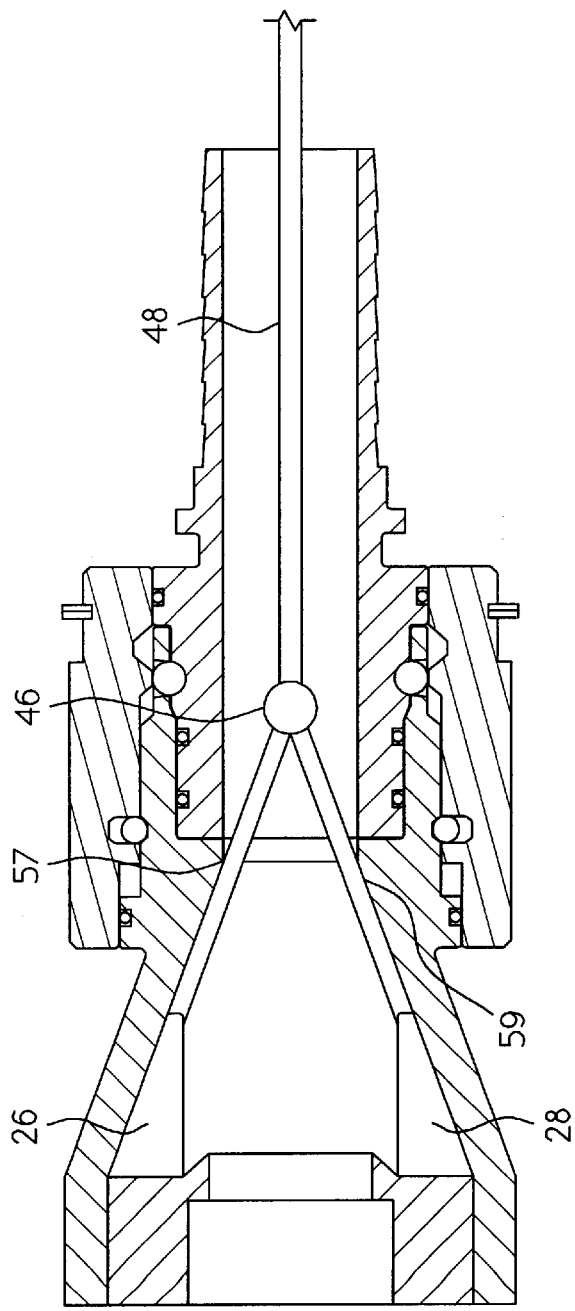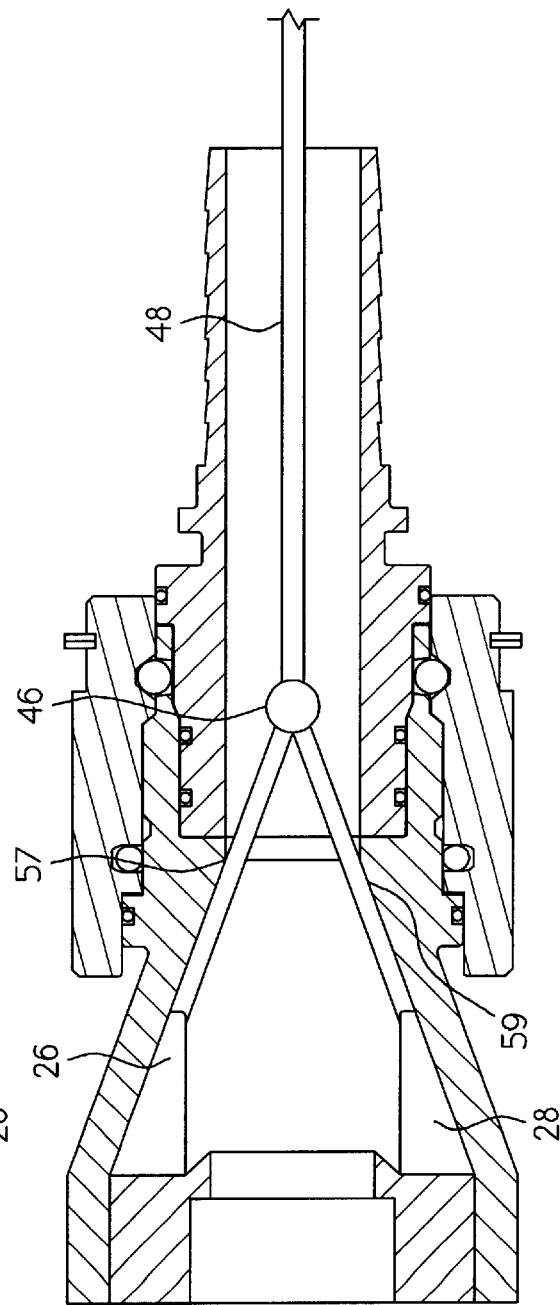

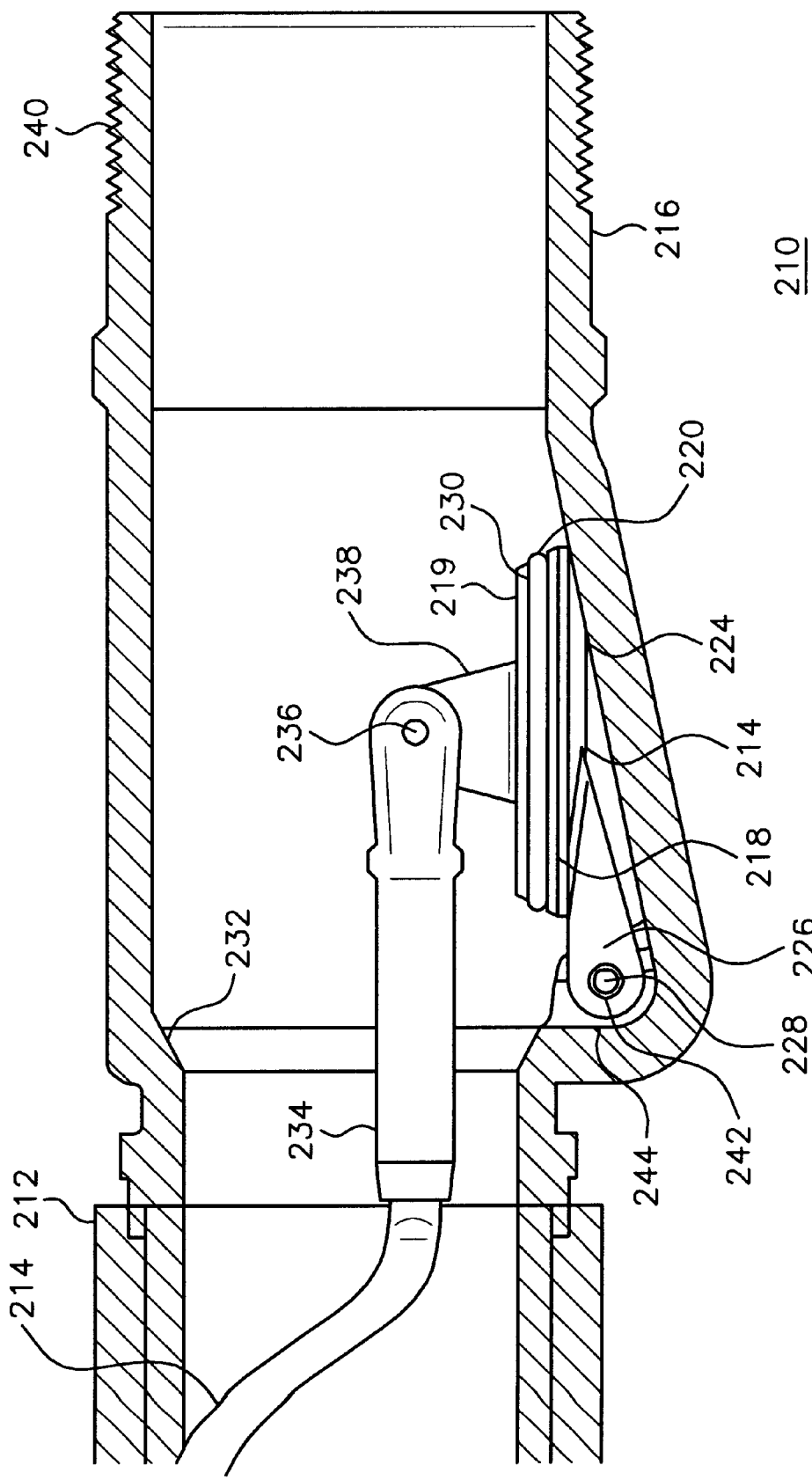

SAFETY SYSTEM FOR FLUID CONDUIT

THIS APPLICATION IS A CONTINUATION-IN-PART APPLICATION OF PRIOR application Ser. No. 09/491,164 FILED Jan. 26, 2000 now U.S. Pat. No. 6,260,569

FIELD OF THE INVENTION

The present invention relates to high-pressure fluid delivery systems and more particularly to an improved safety conduit for use in high-pressure fluid delivery systems.

BACKGROUND OF THE INVENTION

As described in U.S. Pat. No. 5,357,998, which is incorporated by reference herein, there is a risk of conduit failure when working with fluids traveling through fluid conduits. Conduit failure can occur in high-pressure and low pressure situations.

When filling containers (which includes, but is not limited to, cylinders, tank trucks, rail cars, and stationary tanks) with compressed or non-compresses gasses or fluids, or operating equipment that relies on pressurized fluid flow or compressed gas, it is necessary for the fluid/gas to be transferred from one container to another. Although the fluid/gas can be transferred from one container to another using solid piping, it is common in many situations to use a flexible conduit or hose attached between the containers. A flexible hose allows ease of connection/disconnection of containers, as well as a limited range of motion between source and destination.

For example, compressed or non-compresses fluid/gas, such as oxygen, nitrogen, carbon dioxide and chemicals, such as petroleum and acids are transported, stored and used in individual containers of varying size and capacity. In order to fill these containers with the desired product, it is necessary to connect each container to a filling connection (either singly or in groups) at the location of a gas filler/seller. In order to connect each container to the filling connection, a flexible hose is used to allow for quick connection/disconnection of the containers to the filling connection. A filling station manifold is one example of a filling connection. In addition, operating equipment that runs or uses compressed gas (such as forklifts) or pressurized fluids (such as hydraulic systems) also benefit from the ease of use of flexible hose.

Hoses can fail, however, even though they are generally made from durable yet flexible materials/constructions, such as treated and reinforced rubber, neoprene, nylon, TEFLON™, stainless steel and others. Hose failures can occur from a number of causes, including ruptures, deteriorations and splits/cuts. When a hose fails, it can cause substantial damage in a number of ways. First, if a hose is completely severed or split, both ends of the hose can whip around wildly under the forces of the compressed gas or fluid, now exerted from the delivery end and the receiving end. In addition, if a container is not secured, the pressure of the gas or fluid leaving the container can cause the container to move very rapidly in the opposite direction of the gas/fluid. Both of these situations can result in substantial risk of personal injury, as well as property damage. Still further, a hose failure will cause a leak from both the delivery and receiving ends, leading to a costly waste of gas or fluid, the discharge of hazardous gas or fluids, as well as the by potential of filling the environment with hazardous fumes.

U.S. Pat. No. 5,357,998 discloses a successful fluid conduit safety system that uses a flexible, yet relatively stiff cable disposed inside of a hose to maintain single valve bodies at either end of the hose in an open position during normal or open operation. When a failure condition, such as a rupture, cut, separation or stretch of the hose occurs, the valve bodies are able to seat with the valve seats, sealing both ends of the hose. This prevents fluid/gas leaks from both sources (i.e. container and filling apparatus). When a failure occurs, the flexible, yet relatively stiff cable may be severed, allowing the fluid pressure to force the valve bodies into engagement with the valve seats. If a hose failure does not sever the cable, the valve seats are either forced into engagement with the valve bodies or the valve bodies are forced into engagement with the valve seats. In either circumstance, a seal is accomplished by seating the valve bodies with the valve seats.

SUMMARY OF THE INVENTION

The present invention involves a safety system for a fluid conduit comprising a fluid conduit having first and second ends, first and second housings attached to said fluid conduit at the respective first and second ends, a first valve seat disposed in the first housing and a second valve seat disposed in the second housing. The first and second valve seats are positioned a first predetermined distance from each other. A first valve body is disposed in the first housing at the first end of the conduit and a second valve body is disposed in the second housing at the second end of the conduit. The first and second valve seats are disposed between the first and second valve bodies, with the first and second valve bodies positioned a second predetermined distance from the first and second valve seats, respectively. A valve control means retains the first and second valve bodies the second predetermined distance from the first and second valve seats, respectively, during an open flow condition, and seats one or both of the first and second plurality of valve bodies with the first and second valve seats, respectively, during a conduit failure.

BRIEF DESCRIPTION OF THE FIGURES

The present invention will now be described by way of non-limiting example, with reference to the attached drawings in which.

Figure 9:
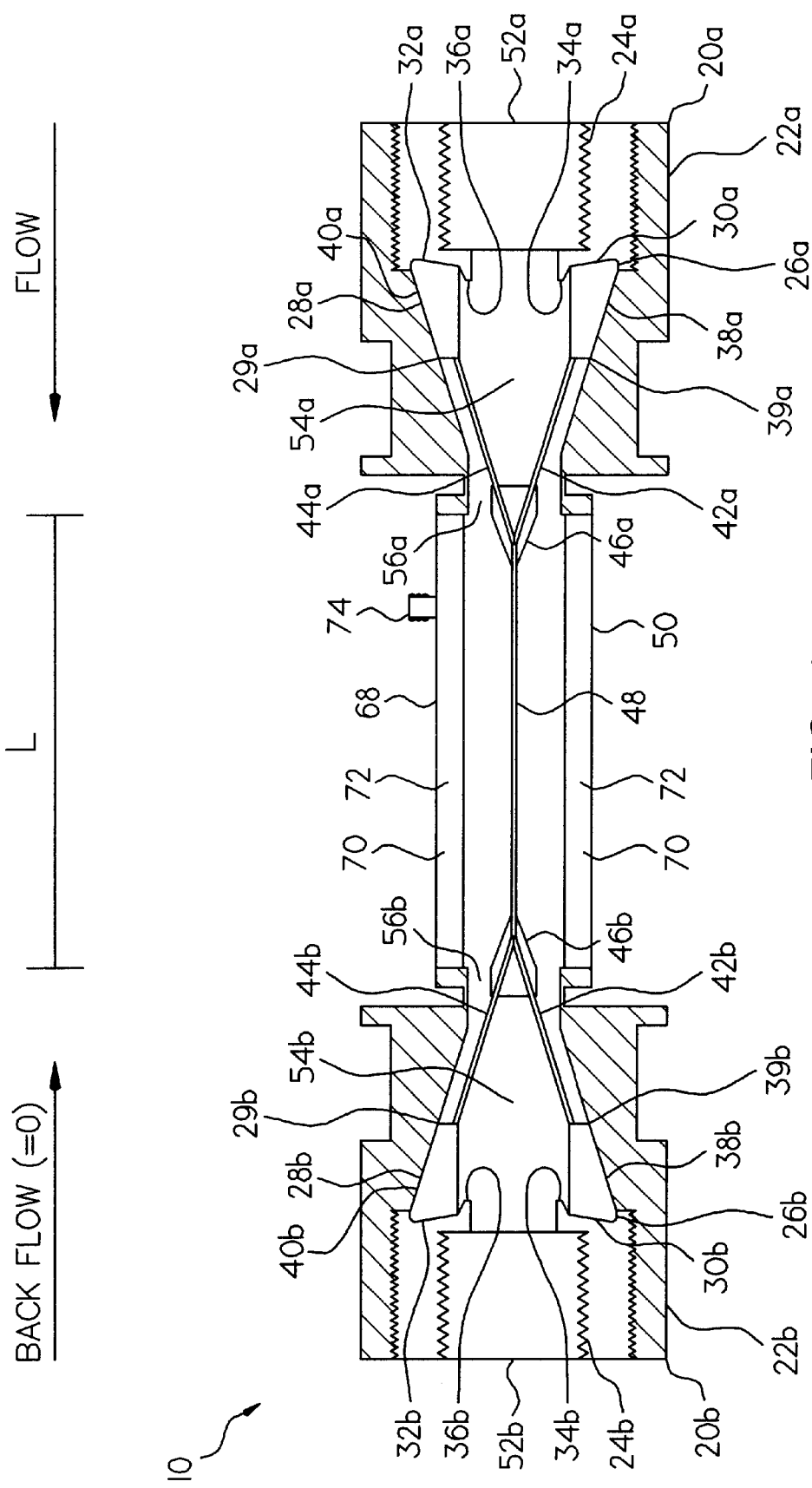
Figure 10:
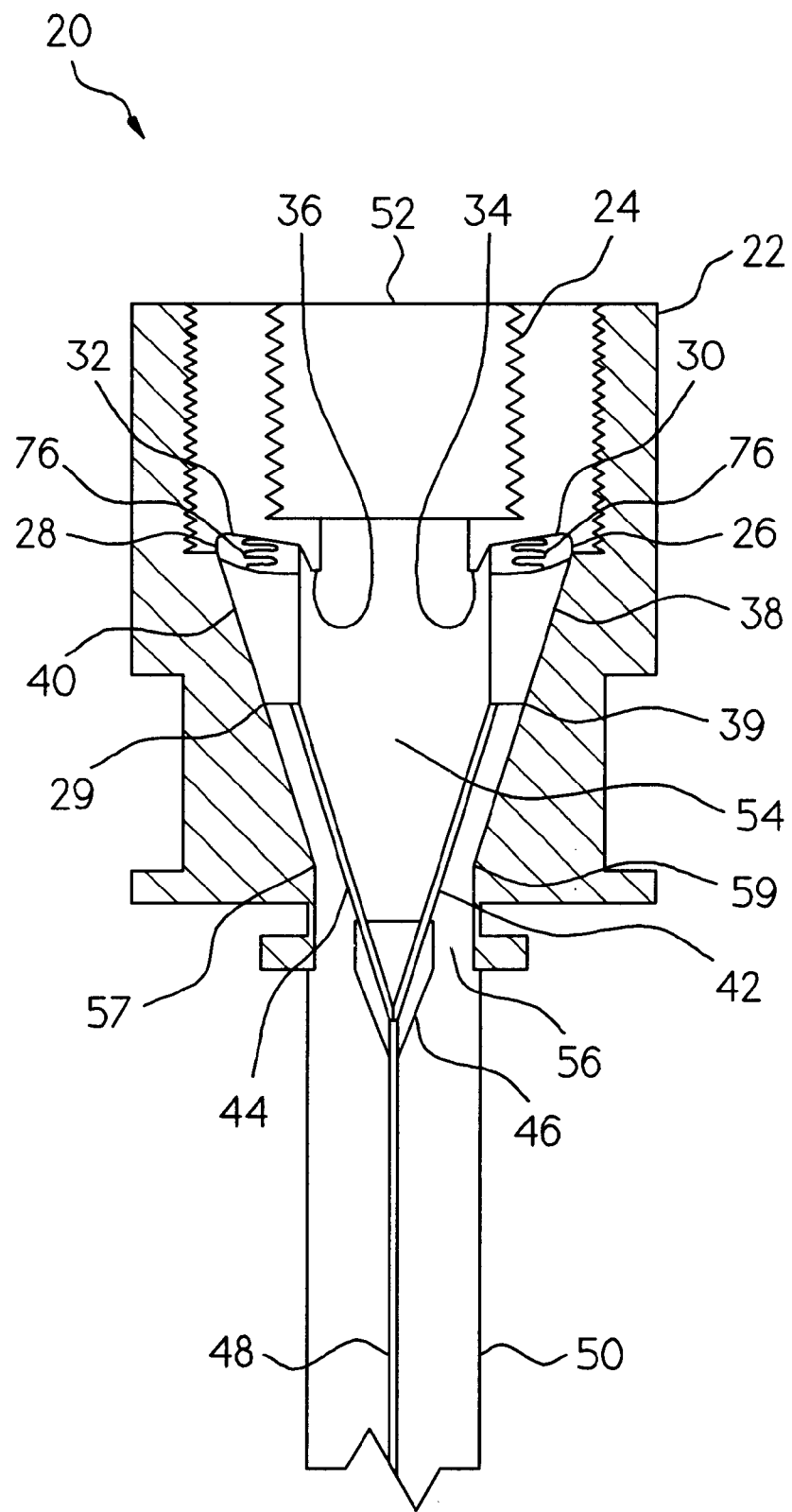
Figure 11:
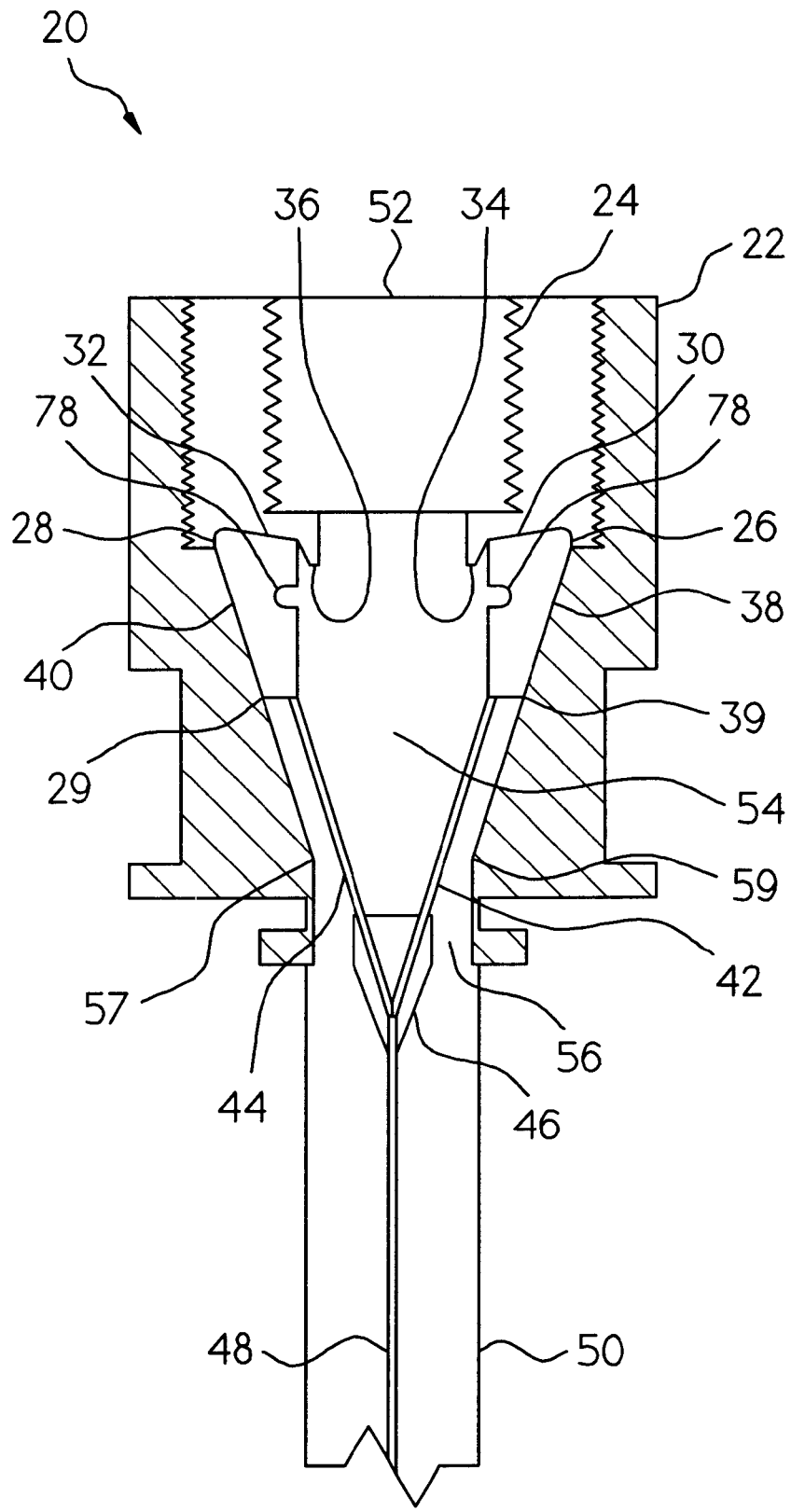
Figure 12:
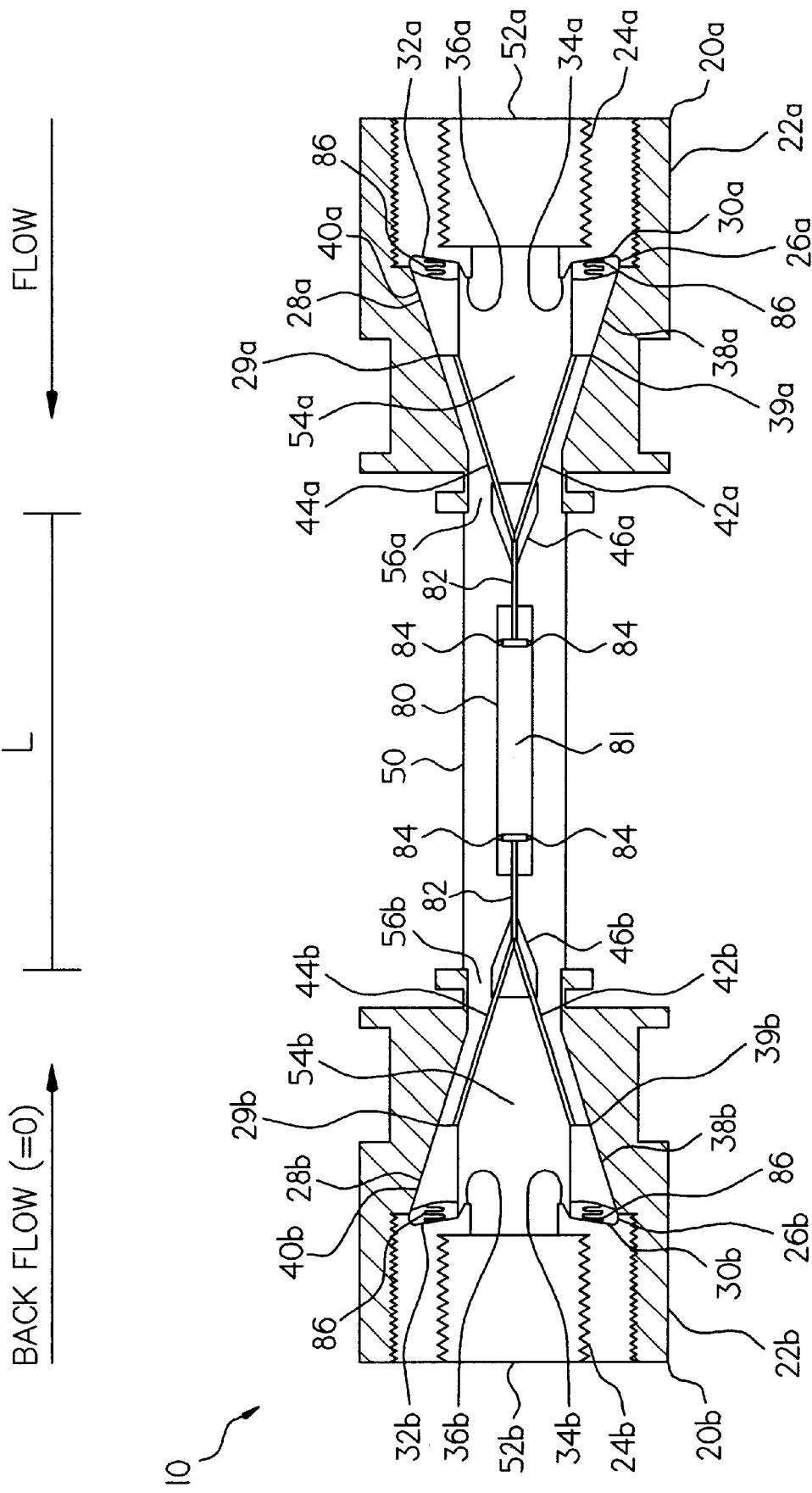
Figure 13:
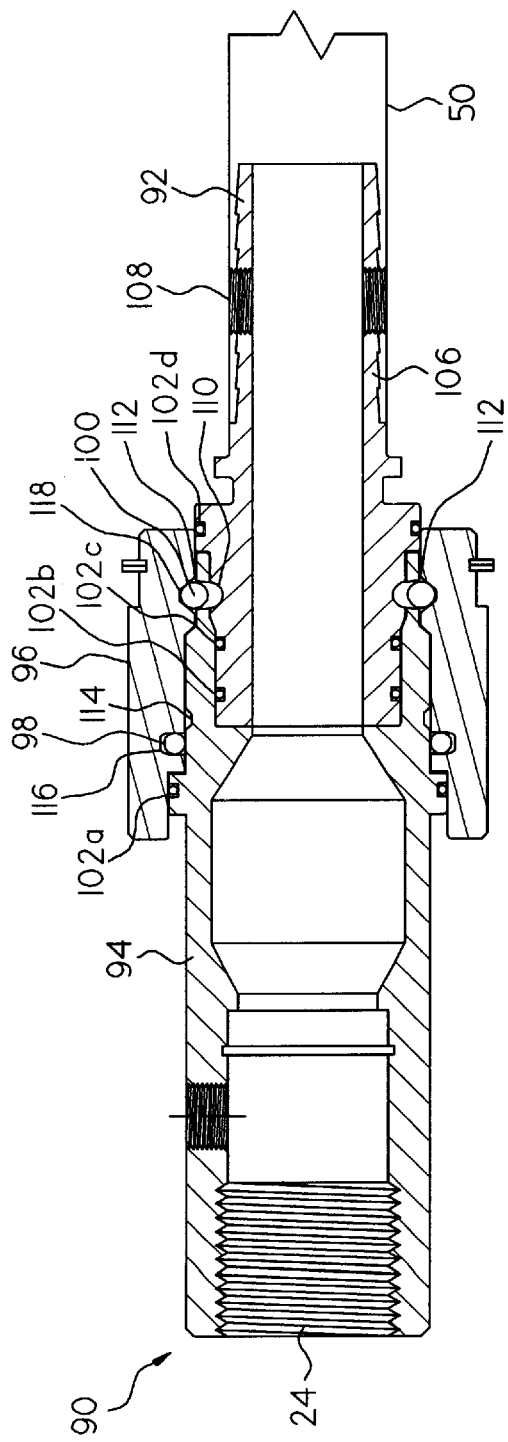
Figure 14:
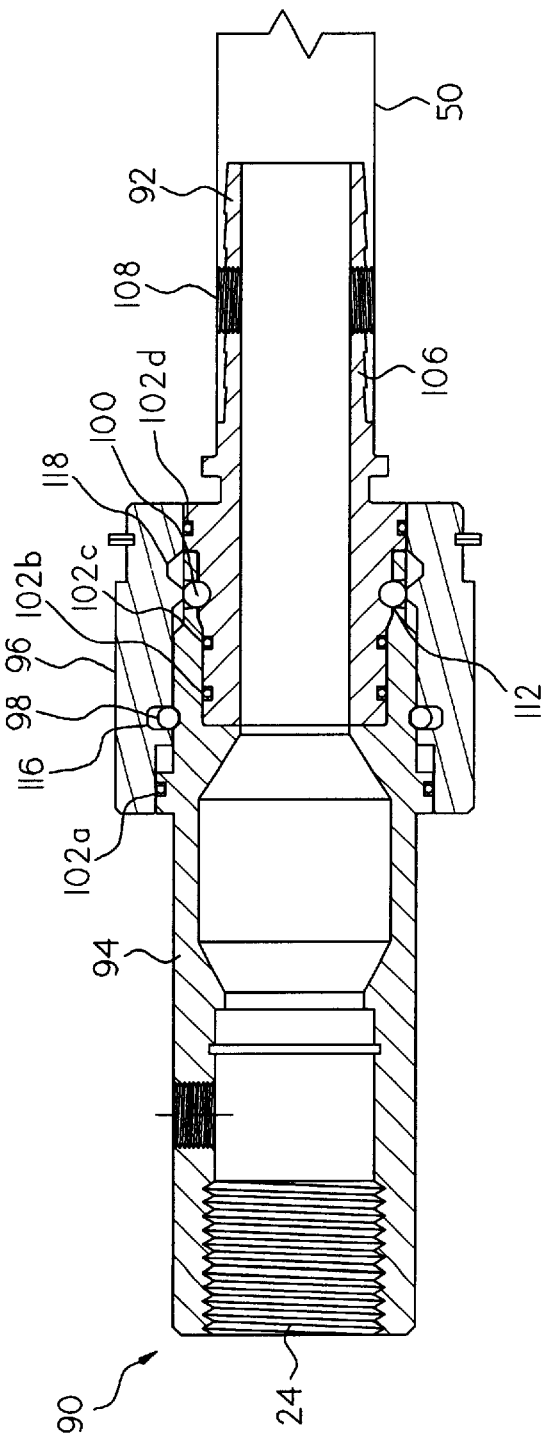
Figure 18:
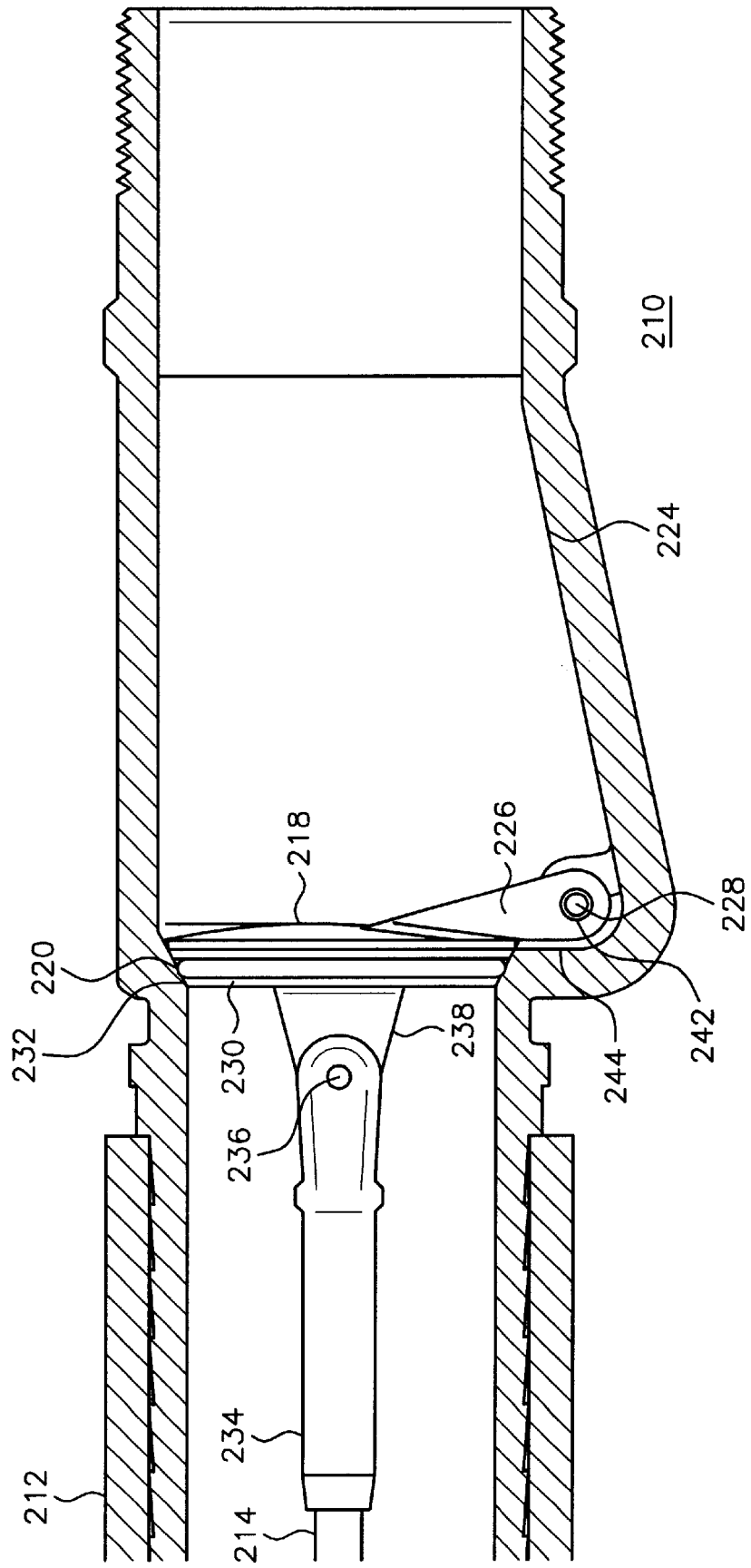
Figure 19:
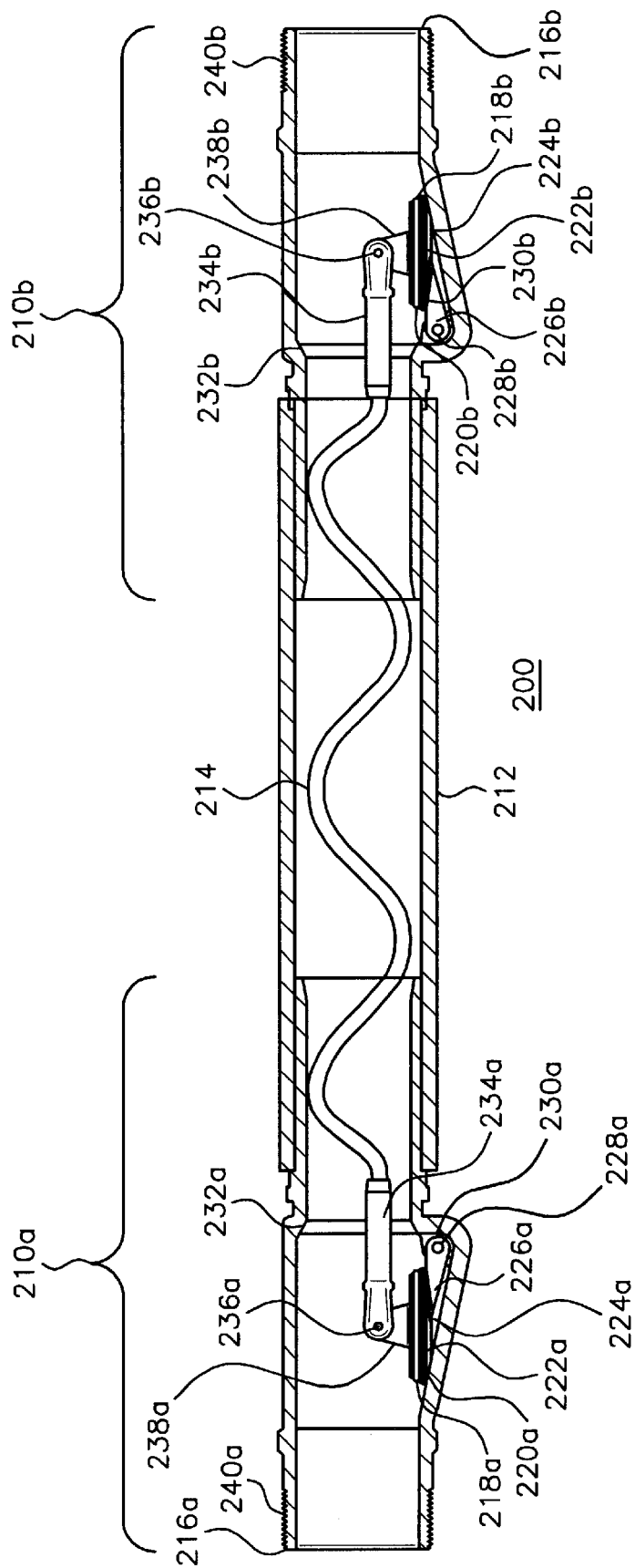
Figure 20:
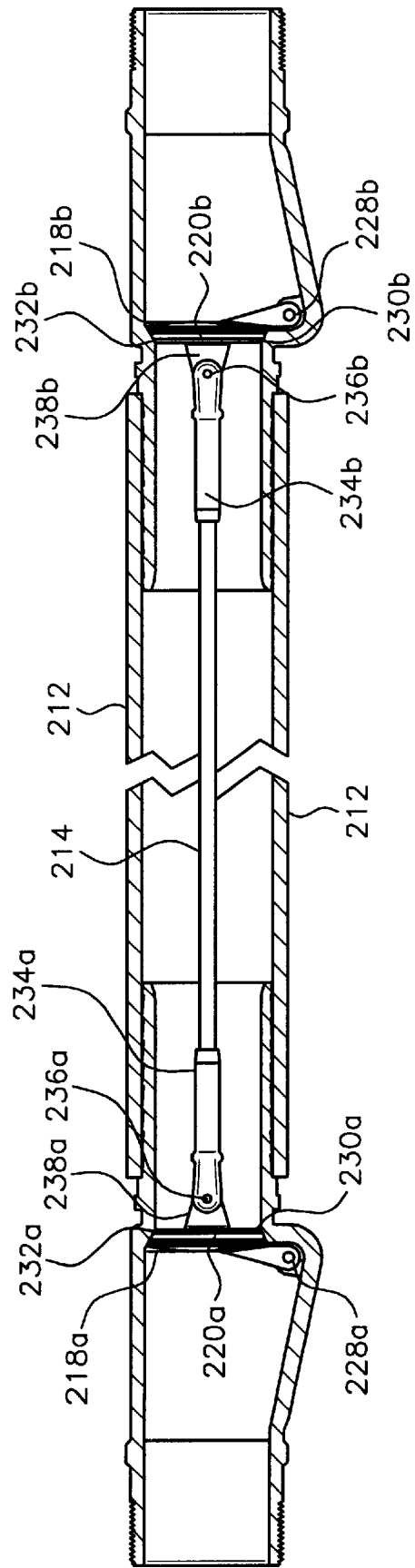

FIG. 9 is a cut away view of an additional embodiment of a fluid/gas conduit safety system in accordance with the present invention;

FIG. 10 is a cut away view of a single valve of an additional embodiment of a fluid/gas conduit safety system in accordance with the present invention;

FIG. 11 is a cut away view of a single valve of an additional embodiment of a fluid/gas conduit safety system in accordance with the present invention;

FIG. 12 is a cut away view of an additional embodiment of a fluid/gas conduit safety system in accordance with the present invention;

FIG. 13 is a cut away view of a breakaway connector for use with a fluid/gas conduit safety system in accordance with the present invention; and FIG. 14 is a cut away view of a breakaway connector for use with a fluid/gas conduit safety system in accordance with the present invention;

FIG. 15 is a cut away view of a breakaway connector and fluid/gas conduit safety system in accordance with the present invention;

FIG. 16 is a cut away view of a breakaway connector and fluid/gas conduit safety system in accordance with the present invention;

FIG. 17 is a cut away view of an additional embodiment of a single valve of a fluid/gas conduit safety system with the valve open, allowing full gas/fluid flow;

FIG. 18 is a cut away view of an additional embodiment of a fluid/gas conduit safety system with the valve closed, allowing no gas/fluid flow, because of a break in the conduit in accordance with the present invention;

FIG. 19 is a cut away view of an additional embodiment of a fluid/gas conduit safety system with the valves open, allowing full gas/fluid flow in accordance with the present invention; and FIG. 20 is a cut away view of an additional embodiment of a fluid/gas conduit safety system with the valves closed, allowing no gas/fluid flow, because of a break in the conduit in accordance with the present invention.

DETAILED DESCRIPTION

Figure 1:
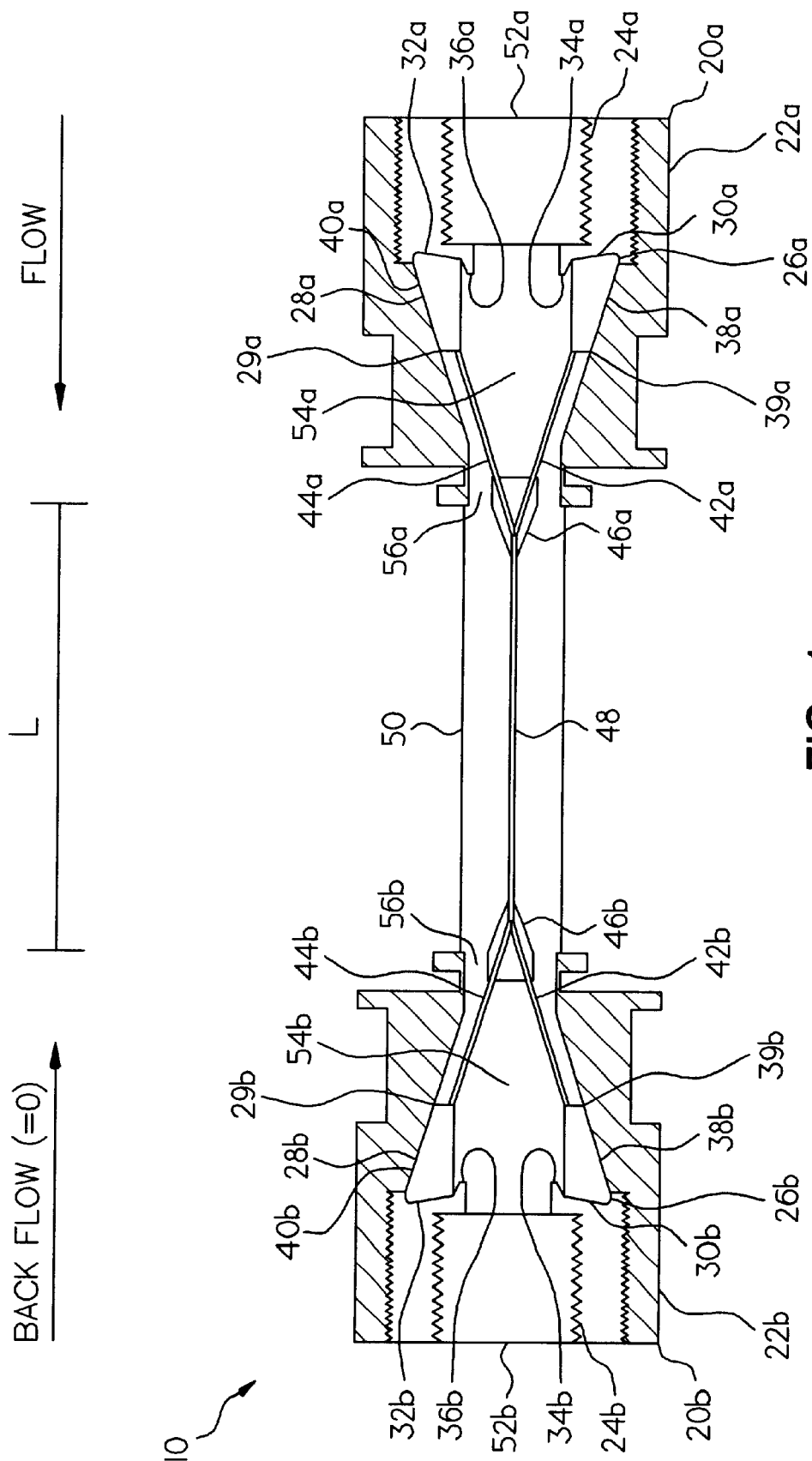
FIG. 1 is a cut away view of a fluid/gas conduit safety system allowing full gas/fluid flow in accordance with the present invention.

There is shown in FIG. 1 a fluid/gas conduit safety system 10. Fluid/gas conduit system 10 is comprised generally of a pair of connector ends 20a and 20b, a fluid/gas conduit or hose 50 disposed between and attached to the respective connectors and an internal cable 48 within hose 50, so that compressed gas or fluids can flow through connector ends 20a and 20b and hose 50 without leakage. Fluids and gasses can generally be collectively referred to as fluids.

Figures 2, 3:
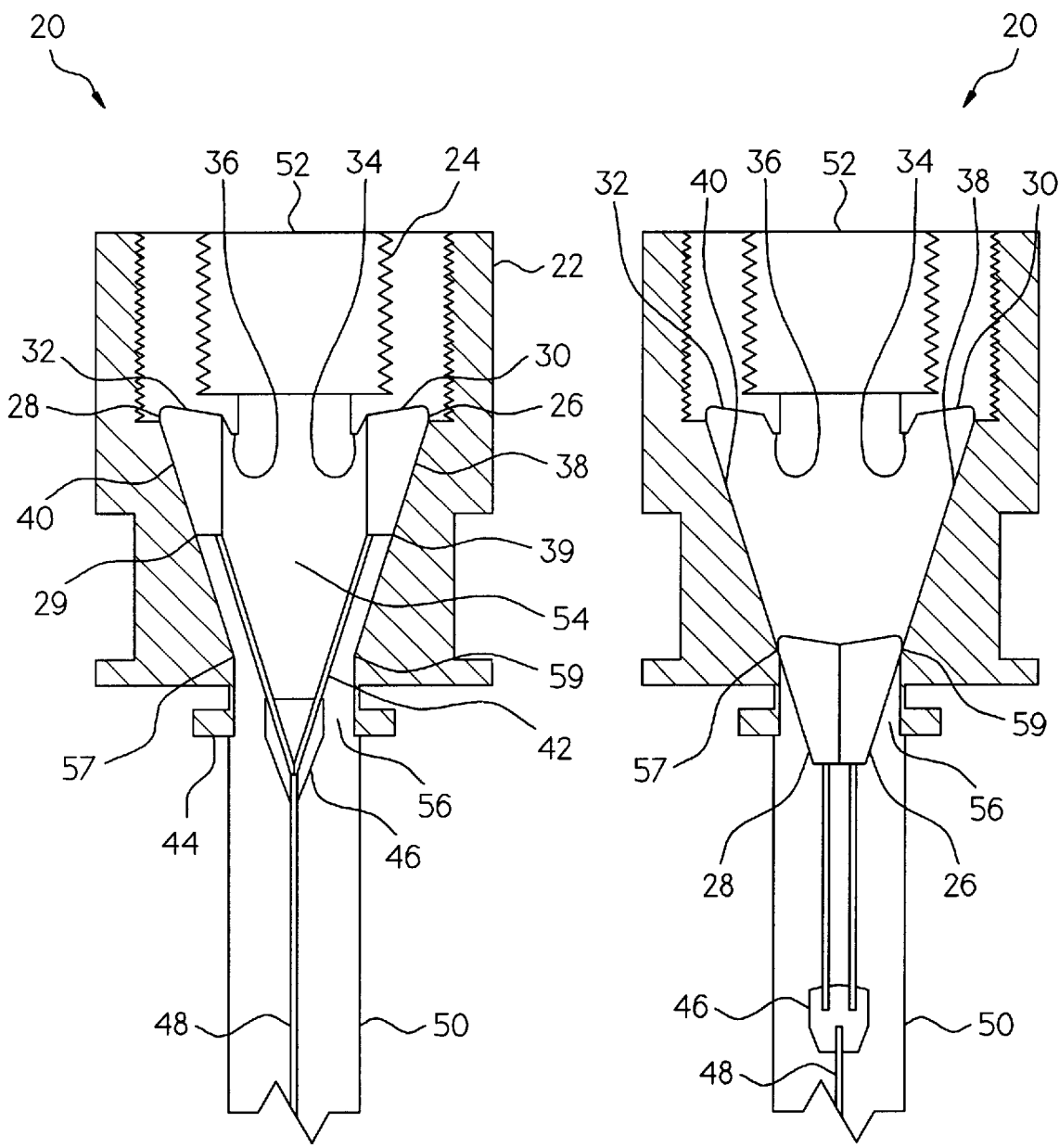
FIG. 2 is a cut away view of a single valve of a fluid/gas conduit safety system with the valve open, allowing full gas/fluid flow.
FIG. 3 is a cut away view of a fluid/gas conduit safety system allowing no gas/fluid flow, because of a break in the conduit in accordance with the present invention.

Connector ends 20a and 20b are identical in design, except that they are positioned at opposite ends of hose 50. Accordingly, gasses or fluids will flow from one connector end to the other, depending upon whether a container fill or a container empty procedure is taking place. Connector ends 20a and 20b, when attached to their respective ends of hose 50 are positioned a predetermined distance from each other, determined by the length of hose 50. For purposes of illustration, connector ends 20a and 20b will be described by reference to connector end 20a, with the understanding that connector end 20b is constructed identically, with like reference numbers having a "b" designation instead of an "a" designation. In FIGS. 2 and 3, only reference numbers are used, without the "a" and "b" designations.

Connector end 20a includes a body or housing 22a and means for connection to a source or destination, such as threads 24 for connection to a valve, container, manifold or other connection for the fill or discharge of gas or fluid. Connector end 20a has two openings. In an exemplary embodiment, housing 20a is made of a metal such as brass or steel. Other materials can be used that can withstand the pressure and chemical environment as will be understood by those skilled in the art. A first aperture or opening 52a allows fluids to enter or leave connector end 20a and the fluid/gas conduit system 10. A second aperture or opening 56a allows gas or fluid to enter or leave hose 50 via connector end 20a. Connector end 20a may also include securing means (not shown) for securing hose 50 to connector end 20a such as a ferrule, clamp or adhesive. Connector end 20a is substantially hollow, containing a center cavity 54a through which gasses or fluids may pass between opening 52a and 56a.

Two wedge shaped valve bodies 28a and 26a are disposed in center cavity 54a. In an exemplary embodiment, valve bodies 28a and 26a are made of a metal such as brass or steel, a plastic, a TEFLON™ composite material. Other materials can be used that can withstand the pressure and chemical environment as will be understood by those skilled in the art. Each valve body is angled in a generally wedge shape. In an exemplary embodiment, wedge shaped valve bodies 28a and 26a are substantially the same size, with the most acute end of each wedge shaped valve body, 29a and 39a, pointed in the direction of opening 56a. Also in an exemplary embodiment, each valve body is wedge shaped with the side closest to its respective sidewall (40a and 38a), curved in substantially the same shape as the respective sidewall. The side opposite end 29a is seated against back wall 32a and between lip 36a and angled sidewall 40a when in the open or gas/fluid flow position. The side opposite end 39a is seated against back wall 30a and between lip 34a and angled sidewall 38a when in the open or gas/fluid flow position. The respective sidewalls, backwalls and lips form a recess within which, the respective valve body is positioned when the valve is in an open position. Valve bodies 28a and 26a are maintained in the open position by links 44a and 42a, respectively. Links 44a and 42a are made of a material that allows valve bodies 28a and 26a to remain in the open position to allow gas/fluid flow and pull valve bodies 28a and 26a into the closed or sealed position (described below) to restrict gas/fluid flow. In an exemplary embodiment, links 42a and 44a are rigid metal rods made from stainless steel or monel. Other metals and materials such as brass, cable, plastic, and composites may be used as will understood by those skilled in the art. A first end of links 44a and 42a is connected to valve bodies 28a and 26a at valve ends 29a and 39a, respectively. Also in an exemplary embodiment, links 44a and 42a are substantially the same length.

Links 44a and 42a are connected to internal cable 48. In an exemplary embodiment, a multipoint connector 46a is used to attach links 44a and 42a to internal cable 48. Multipoint connector 46a can be made of metal such as brass or steel. Other materials can be used that can withstand the pressure and chemical environment as will be understood by those skilled in the art.

Internal cable 48 is also made from a flexible yet relatively stiff material capable of retaining valve bodies 28a and 26a in the respective recesses in an open position allowing gas/fluid flow during normal operation. Exemplary materials for internal cable 48 are steel cable or braided cable. Other suitable materials for internal cable 48 will be understood by those skilled in the art. Internal cable 48 can be considered a valve control means, particularly in combination with cables 44*a* and 42*a*.

Hose 50 is shown having a length L. A cut, tear, rupture or stretch of hose 50 can cause hose 50 to increase in length L, constituting a failure condition. Flow and back flow directions are also shown. Flow is considered the gas/fluid fill or evacuation direction. Back flow is considered the resisting pressure Opening 56*a* is generally circular with sidewalls 40*a* and 38*a* extending at an angle away from opening 56*a* towards backwalls 32*a* and 30*a*, respectively. In an exemplary embodiment, internal cavity 54*a* is generally conical with a truncated apex at or near opening 56*a* and a base defined at or near backwalls 32*a* and 30*a*. Sidewalls 40*a* and 38*a* extend from the base portion to the apex portion. The upper part of sidewalls 40*a* and 38*a* at the apex section of internal cavity 54*a* serves as the valve seat in housing 22*a*. This is identified as valve seats 57 and 59 in the cut away view of FIG.2. In an alternative embodiment, the cylindrical sidewall surface that defines opening 56*a* can serve as the valve seat of the present invention. In an additional embodiment (not shown) an O-ring may serve or be a part of the valve seat. Valve bodies 26*a* and 28*a* seat in valve seats 57 and 59 when in the closed position. In an exemplary embodiment, wedge shaped valve bodies 28*a* and 26*a* are angled substantially the same as the angle of conical sidewalls 40*a* and 38*a*.

When situated in their respective recesses during open or normal operation, valve bodies 28*a* and 26*a* are positioned a predetermined distance from their respective valve seats. The distance is determined, in part, by the size of the respective housing. The closer the valve body pairs are to the valve seat, the faster the seating of the valve bodies in the valve seats during conduit failure, because of the shorter distance that the valve bodies have to travel.

FIGS. 2 and 3 show the position of valve bodies 28 and 26 in the open (FIG. 2) and closed (FIG. 3) positions.

Figure 4:
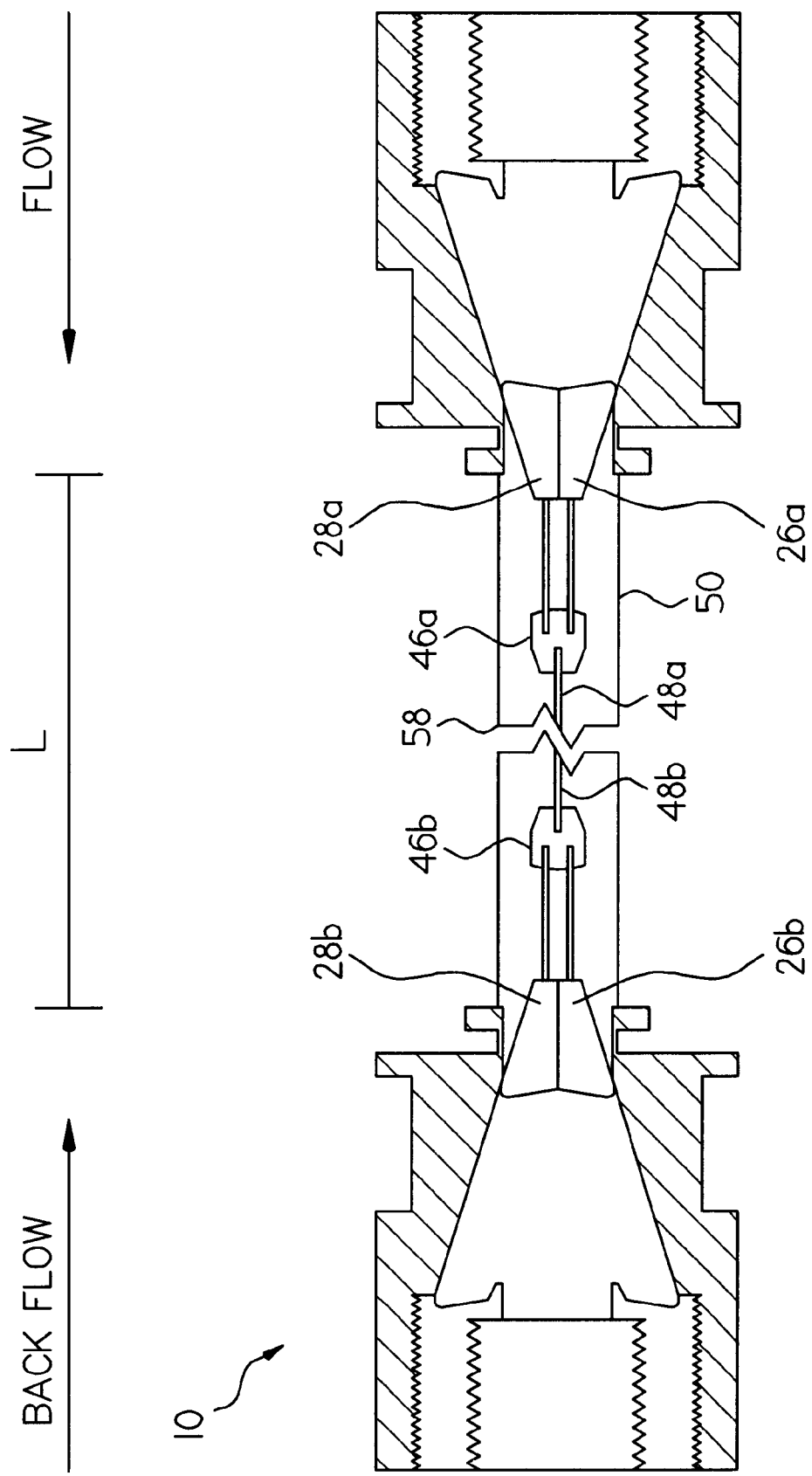
FIG. 4 is a cut away view of a fluid/gas conduit safety system allowing no gas/fluid flow because of a separation of the hose portion of the conduit in accordance with the present invention.

In FIG. 4 system 10 is shown with a cut or separation 58 in hose 50. When such a conduit failure occurs and internal cable 48 is severed internal cable 48 no longer exerts the force necessary to maintain the valve seats at a predetermined distance from the valve bodies, i.e. in the open position. Each of the valve body pairs (28*a*, 26*a*) and (28*b*, 26*b*) then engage their respective valve seats due to the pull of internal cable 48 towards the respective valve seats and/or the pressure of the gas or fluid flowing past the respective valve pairs. Each valve body pair (28*a*, 26*a*) and (28*b*, 26*b*) essentially forms a substantially solid single valve body during conduit failure when engaging the respective valve seat. When seated, the valve body pairs, acting as a single valve body, are pulled sufficiently tight and close together to prevent the flow of gas or fluid (leakage).

In an exemplary embodiment, the valve seat pairs engage the respective valve body during certain conduit failures, such as severing of hose 50, substantially simultaneously with said conduit failure. In other conduit failures, the valve seat pairs engage the respective valve body in three seconds or less. Because of the damage that can arise from a whipping hose or release of hazardous fluid/gas into the atmosphere/environment, quick seating of a valve body pair with a valve seat is advantageous.

Figure 5:
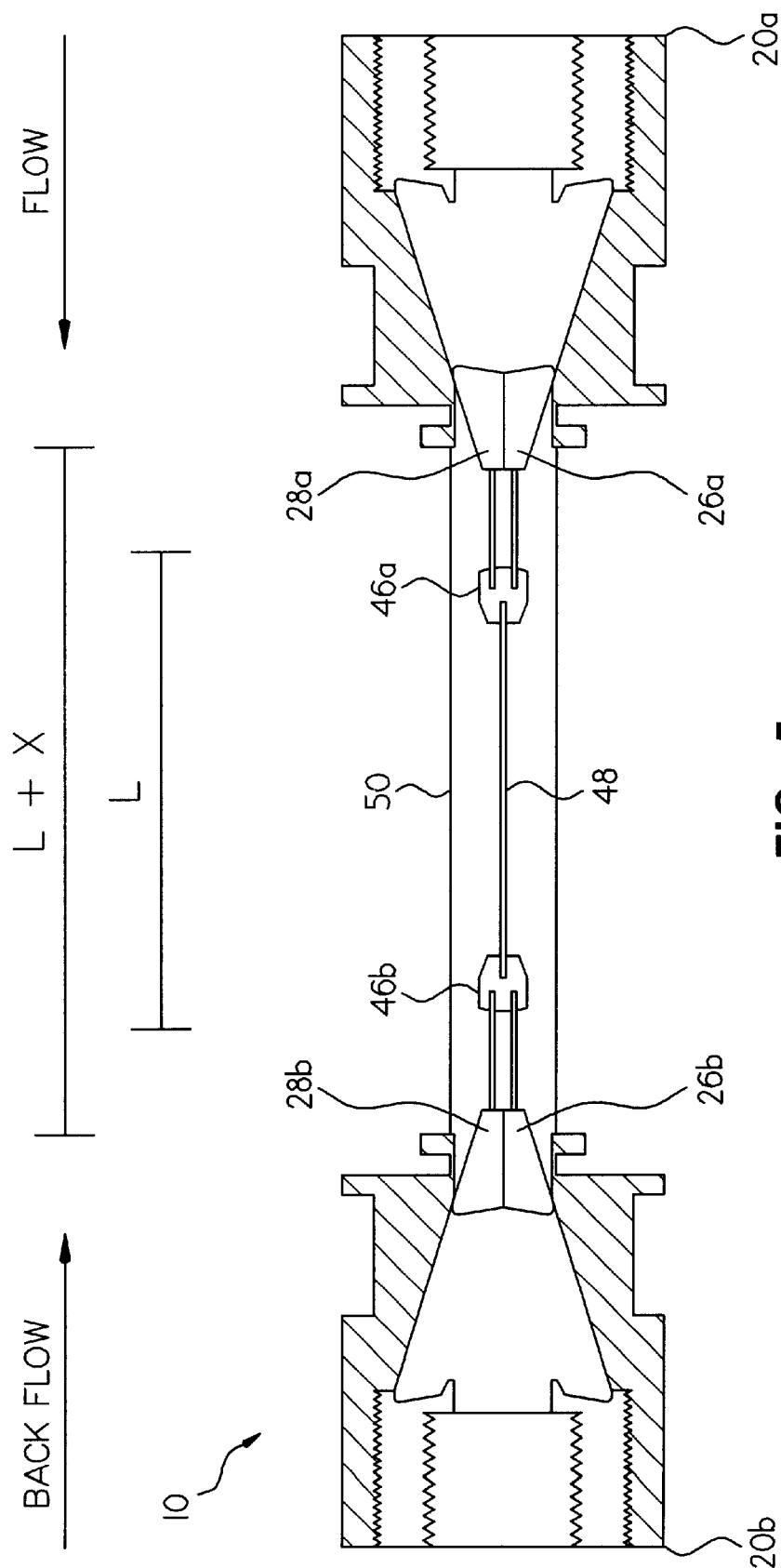
FIG. 5 is a cut away view of a fluid/gas conduit safety system allowing no gas/fluid flow because of a stretching of the hose portion of the conduit in accordance with the present invention.

In FIG. 5, system 10 is shown with hose 50 being stretched a distance X beyond hose 50's normal length L. This causes a conduit failure condition causing the respective valve body pairs to seat in the respective valve seats.

Figure 6:
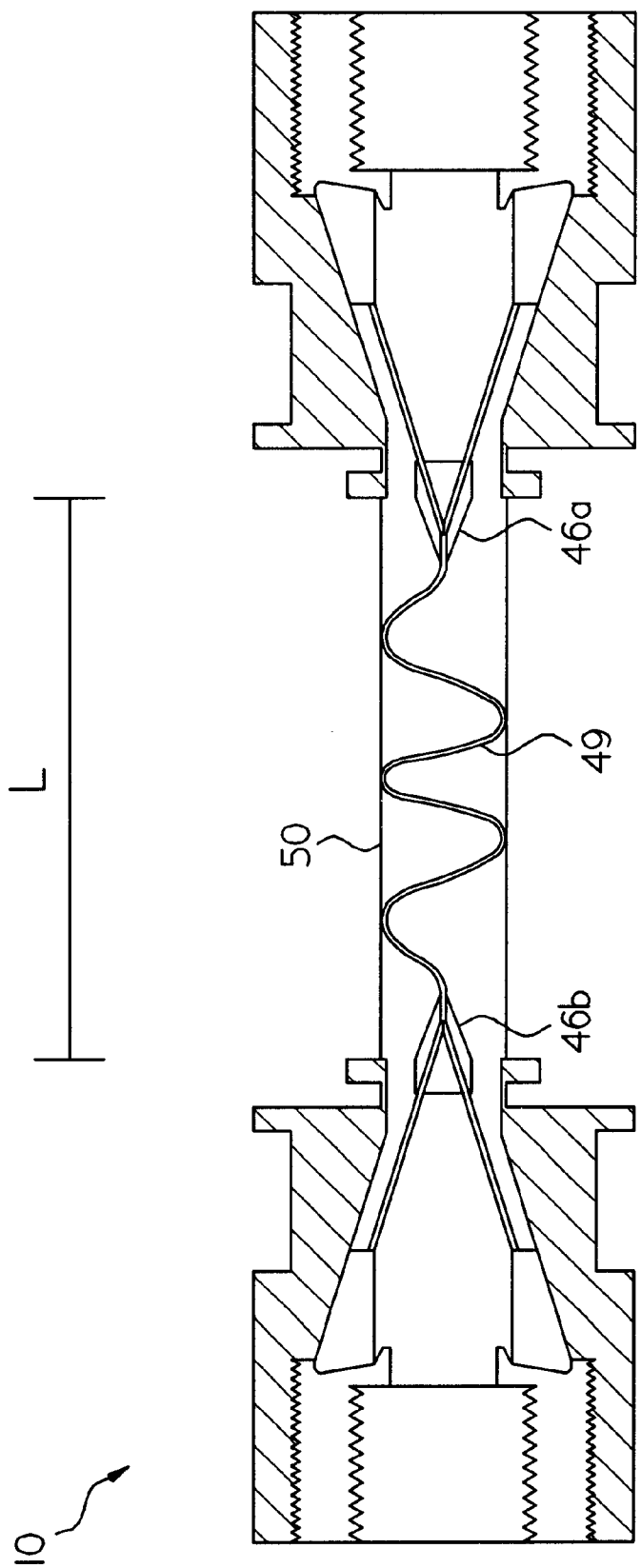
FIG. 6 is a cut away view of an additional embodiment of a fluid/gas conduit safety system in accordance with the present invention.

In FIG. 6, an alternate embodiment is shown. In this embodiment, an extended internal cable 49 has a greater length than internal cable 48 shown in FIG. 1. Extended internal cable 49 is positioned in a serpentine distribution within hose 50. This serpentine positioning provides additional flexibility and greater bending radius than a relatively straight internal cable as shown in FIG. 1. The serpentine positioning maintains sufficient force against the valve bodies to maintain them in the open position, within the respective recesses during normal, open gas/fluid flow.

In another alternate embodiment (not shown), more than two wedge shaped valve bodies are used, each valve body positioned in a separate recess when in the opened position. In such an embodiment, each wedge shaped valve body may be separately connected to separate links that are, in turn, connected to internal cable 48. The more than two valve bodies of this embodiment would still form a substantially solid valve body during conduit failure when engaging the valve seat. This alternate embodiment can be combined with the other embodiments shown in the figures and described herein.

In still another embodiment (not shown) an external cable takes the place of or operates in conjunction with internal cable 48. In such an embodiment, the external cable would be connected through a sealed linkage to the valve bodies, the internal cable, the linking cables and/or the multipoint connector.

In still another embodiment (not shown), internal cable 48 is a pressurized tube that retains the valve bodies in an open position when pressurized. When the pressure in the pressurized tube drops below a predetermined amount, there is insufficient pressure to maintain the valve bodies in an open position. At that point, the valve bodies seat, closing the valve.

In still another embodiment (not shown), an electronic circuit measures fluid/gas flow rate and/or pressure within hose 50. When pressure or flow rate reaches a predetermined level, the electronic circuit signals a valve close condition. This signal would activate a valve closing means to release any retaining member that was maintaining the valve bodies in the open position, such as by severing or contracting an internal cable or linking cable, or depressurizing an internal pressurized tube. The predetermined level in such an embodiment could also be set to account for extreme changes in flow rate or pressure, if it was desired that such a condition should result in a valve closure. Such a system could provide a monitoring or early warning system for hose/system integrity.

In another embodiment (not shown), internal valve bodies and valve seats are replaced by an external valve. Such an external valve is a valve located outside or beyond connector 20. In such an embodiment, the external valve is actuated through a sealed linkage. Valve closure would result from the same conditions as described above with respect to the internal valve bodies and valve seats.

In another embodiment (not shown), only a single valve (valve body/valve seat) is used at a single end of hose 50.

Figure 7:
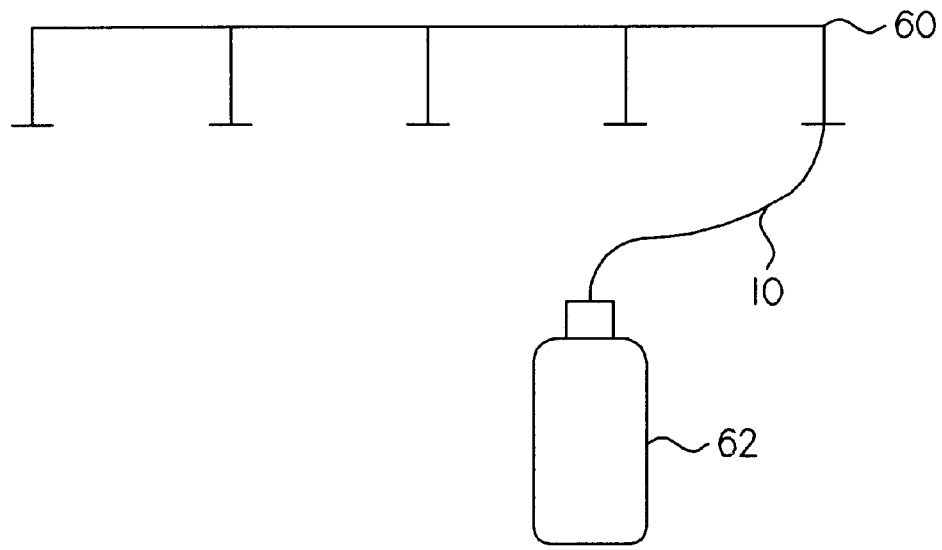
FIG. 7 is a diagram of a cylinder filling apparatus using a fluid/gas conduit safety system in accordance with the present invention.

In FIG. 7, a container filling station is shown with fluid/gas conduit safety system 10 attached to a valve connected to a container fill manifold 60 at one end and a container (cylinder) 62 valve at the other end.

Figure 8:
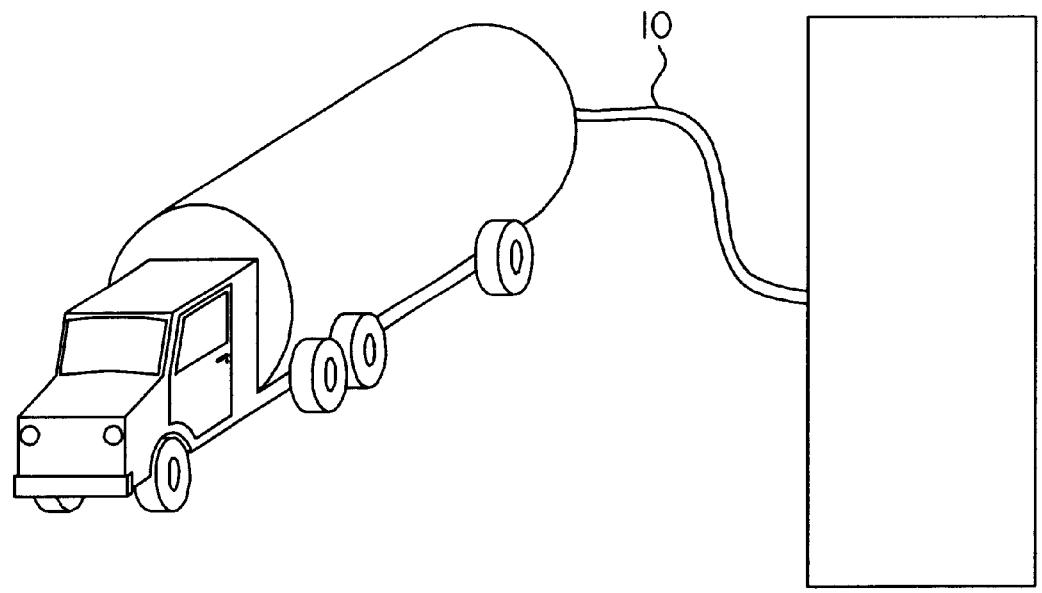
FIG. 8 is a diagram of a fluid/gas transport vehicle delivering or receiving fluid/gas to or from a source/ destination through fluid/gas conduit safety system in accordance with the present invention.

FIG. 8 shows a fluid/gas transport vehicle 64 connected to a source/destination container 66 through fluid/gas conduit safety system 10. Transport vehicle 64 can be delivering or receiving fluid/gas, depending upon the particular application.

In operation, a first end of the fluid/gas conduit is connected to a filling container, while the second end of the fluid/gas conduit is connected to a receiving container. The term filling container is meant to represent a filling source and the term receiving container is meant to represent a receiving destination, regardless of whether either or both is actually a container. The exact nature of the filling container and the receiving container depends upon the ultimate application. For example, the filling container may be a transport vehicle or connected through a hose or routing system before the connection is made to the fluid/gas conduit of the present invention. A similar situation may apply to the receiving container. In addition, the receiving container may be the actual use of the gas or fluid which is thus not actually contained.

In an additional embodiment, the flexible fluid conduit, such as hose 50, shown in FIG. 1 is replaced with a non-flexible hose or pipe, such as a steel, plastic or copper pipe.

Still another embodiment is shown in FIG. 9, with an outer, second hose 68 surrounding an inner, hose 50 from hose system 10. Each of the inner and outer hoses is connected to a housing, such as connector housing 22. A gap or space (cavity) 70 is defined between inner hose 50 and outer hose 68. Gap 70 is filled with a material 72 which serves to indicate whether a hose fault, such as a tear or puncture in inner hose 50 has occurred. Outer hose 68 serves as an indicator of a problem or potential problem with hose 50. Pressurized gas can be sealed in gap 70 at the factory or pressurized by an optional separate fill valve shown as fill valve 74. Fill valve 74 may be disposed on the outer hose or on the housing, so long as it is in fluid communication with the cavity formed between the inner and outer hoses. A separate fill valve 74 allows the pressurized gas to be "topped off" to maintain pressure. A separate fill valve 74 also allows for the pressurized gas to be replaced, or if desired, replaced with a different pressurized gas. Such an indicator system is particularly useful where the hose failure has not caused a cut off condition, causing the valve bodies to seat, as described previously. Gap 70 is filled with a pressurized fluid/gas as material 72 that will indicate that a tear, cut, puncture or other breach of outer hose 68 has occurred. For example, a pinhole type puncture may not be sufficient to activate the valve seating. By using an outer, second hose with a pressurized gap, a leak in the primary inner hose will cause a pressure increase in the outer hose, causing it to deform. The deformation will be recognizable to the user. In still another embodiment, the hose material of the outer, second hose, changes color when stretched by the increase in pressure from the inner hose leak. This change in color may be more readily identifiable to the user, indicating the leak or inner hose failure.

In another embodiment, gap 70 is filled with a pressurized fluid/gas as material 72 that will indicate that a tear, cut, puncture or other breach of outer hose 68 has occurred. The pressurized gas can indicate this failure condition of outer hose 68 by being a distinct color that will be recognized by a user.

Preferably such a pressurized gas will be a different color than any fluid being transported through the hose system. A pressurized gas may also be used that reacts with the fluid being transported through the hose system so that in the event of a hose failure, a first distinct color would be evident if there was only a failure with outer hose 68. A second distinct color would be evident if the pressurized gas was contaminated with the fluid being transported through the hose system. In this way, the user could tell if there was an outer hose 68 failure or a failure of both inner hose 50 and outer hose 68.

In still an additional embodiment of the system shown in FIG. 9, gap 70 is filled with a sealing material that can seal a puncture, small tear, small cut or other minor breach of either hose 50 or hose 68. Such a sealing material would harden or flexibly harden to match the flexible properties of the respective hose when in contact with the either the fluid being transported through the hose system (in the case of a breach of hose 50) or by the outside air (in the case of a breach of outer hose 68). A sealing material of this type would preferably appear as a deformation (bump, irregularity, ridge, blob) or distinct color on the surface of outer hose 68 in the case of a breach of outer hose 68. A sealing material of this type, in conjunction with the material of outer hose 68 would preferably show a deformation in the shape of outer hose 68 in the event of a hose breach of inner hose 50 where there is no breach of outer hose 68. Because a hose system of the present invention is a safety system, it is desirable that an outer hose with a sealing material in gap 70 be used in conjunction with a cut off system, such as one of those described throughout this specification. In this way, the sealing material would only serve as a temporary fix to a minor hose breach problem, with the main cut off system still in place in the event that the hose breach problem worsened or was not temporarily solved by the sealing material. A sealing mechanism also controls the amount of gas that can leak into the atmosphere.

FIG. 10 shows still another embodiment of the present invention. A spring 76 is positioned behind each wedge shaped valve body 26 and 28. Springs 76 bias the valve bodies against the valve control means, such as cable 48 and linking cables 42 and 44. Springs 76 insure and accelerate valve closure by forcing the seating of the wedge shaped valve bodies upon a hose failure. When a hose failure occurs, counter pressure from cables 44 and 42 is removed, allowing springs 76 to expand, forcing each wedge shaped valve body to seat. In a sub-embodiment, a single spring is used, instead of a separate spring for each wedge shaped body. This single spring would contact back wall 30 and the side of the wedge shaped valve body that would otherwise be in contact with back wall 30.

FIG. 11 shows still another embodiment of the present invention. A flap or edge 78 is shown on the surface of each wedge shaped valve body 26 and 28 in the path of fluid flow. In the event of a hose failure and release of the counter pressure holding back each wedge shaped valve body, flap 78 assists the seating and speed of seating of each wedge shaped valve body 26 and 28 due to the pressure of the fluid. Flap 78 is preferably of a size that does not inhibit the satisfactory flow of the fluid. Flap 78 is of a size and orientation that will not interfere with seating of the valve bodies with the valve seats during a hose failure.

FIG. 12 shows another embodiment of the present invention wherein cable 48 is replaced with a pressurized tube 80 containing a gas/fluid 81. In an exemplary embodiment, pressurized tube 80 is terminated at each end with a piston 82. Each piston 82 is then connected to a pair of links, such as links 42*a* and 44*a*. A mulitpoint connector, such as multipoint connector 46*a*. Like in the previous embodiments, metal rods can be used for links 42*a* and 44*a*. Pressurized tube 80 can be made of a material such as a flexible plastic or Teflon®. Pistons 82 can be made of a material such as plastic or stainless steel. Pistons 82 are shown with o-rings 84 forming a seal between the piston wall and the inside wall of tube 80. O-rings 84 allow limited movement of pistons within pressurized tube 80, due to flexing of hose 50. In combination with pressurized tube 80 is a spring mechanism 86. Spring mechanism 86 adds a bias against the pressure from pressurized hose 80. Upon failure, one or both pistons 82 are released, depressurizing hose 80 and thereby releasing the counterpressure against spring mechanism 86. The spring force then causes the valve bodies to move into a sealing arrangement by seating in the valve seat. The pressurized hose design is particularly useful for longer distances where there may be so many coils/bends in cable 48 that it can not maintain adequate pressure against the valve seats.

Referring to FIGS. 13 and 14, a breakaway coupling system 90 is shown for use with the present invention. Breakaway coupling system 90 is used as an alternative form of coupling or connection to a pressurized fluid transfer or delivery system to that of the threaded connector ends 20a and 20b shown in the previous embodiments.

Breakaway coupling system 90 is comprised of a barb 92, a fitting 94, a release collar 96, a snap ring 98 and ball bearings 100. O-rings 102 are also shown to provide, a seal. Threads 24 are shown for mating with the delivery source and/or receiving destination of the pressurized fluid, similar to threads 24 shown and described with respect to previous embodiments.

Barb 92 is inserted into a hose, such as hose 50. A plurality of ridges 104 may be formed on the surface of barb 92 to assist in securing barb 92 to hose 50. A securing means such as a crimped ferrule 106 or screw tightened securing ring (not shown) is used to secure hose 50 to barb 92. Barb 92 has grooves for o-rings 102b, 102c, and 102d. Fewer or greater number of o-ring grooves and corresponding o-rings may be used, depending upon the application. O-rings 102 act as seal to prevent leakage of pressurized fluid. Barb 92 also has an indentation or groove 110, in which a ball bearing 100 can sit. In an exemplary embodiment, 12 ball bearings 100 are used with a corresponding groove 110. Fewer or greater number of ball bearings 100 and corresponding indentations or groove 110 may be used, depending upon the application.

Barb 92 is inserted into a fitting 94. Fitting 94 provides the structural detail to mount breakaway system 90 to the delivery/destination equipment for the pressurized fluid. In the exemplary embodiment shown, threads 24 are shown. Other connection or coupling means may be used as understood by those skilled in the art. Fitting 94 has an opening for mating with barb 92. O-rings 102b and 102c form a seal against the internal walls of the barb receiving opening of fitting 92. Holes 112 extend through fitting 94 and have a diameter sufficient to receive ball bearings 100. If not blocked, ball bearings 100 can freely pass through holes 112. Holes 112 are designed to align with radiused groove 110 when barb 92 is fully inserted into fitting 94. Fitting 94 also has a groove for o-ring 102a. O-rings 102a and 102d are used to seal against release collar 96. A ramp sided groove 114 is for retaining a snap ring 98. Ramp sided groove 114 has inclined walls, wherein the inclination of the walls determines the release force necessary to overcome the retaining spring force of snap ring 98. The force necessary to allow a release condition can be set or adjusted by varying the ramp angle of ramp sided groove 114 and/or the spring force of snap ring 98

Release collar 96 has a recess or clearance groove 116 for snap ring 98 and a recess or clearance groove 118 for ball bearing 100. When barb 92 is fitted within fitting 94 and the barb fitting combination is fitted within release collar 96, snap ring 98 is positioned in both clearance groove 116 and ramp sided groove 114, aligning and securing the components of breakaway system 90. Release collar 96 can slide laterally over fitting 94. In the exemplary embodiment, release collar 96 has a tapered or stepped internal cavity which allows fitting 94 to be inserted from one side only. Upon release, this prevents fitting 94 from being pulled out along with barb 92. Release collar 96 is mounted via a mounting means, such as a bracket (not shown) to the delivery and/or destination equipment.

Operation of breakaway system 90 is shown, first with respect to FIG. 14 with release collar 96 in the neutral or engaged position. In the neutral position, release collar 96 is positioned such that the inner wall of the opening in which fitting 94 is positioned presses against ball bearing 100, keeping ball bearing 100 pressed into groove 110 of barb 92. This downward force from the internal wall of fitting 94 maintains barb 92 locked to fitting 94, which is in turn, locked to release collar 96 by snap ring 98.

Upon a release condition, a force, such as the pulling of hose 50 away from fitting 94 (in the release direction), pulls on barb 92. Because barb 92 is locked to fitting 94 and release collar 96 is fixedly mounted to the delivery and/or destination equipment, the barb 92/fitting 94 combination will move laterally with respect to collar 96, from the neutral position shown in FIG. 14 to the release position shown in FIG. 13. In order for this movement to occur, the force pulling on barb 92 must be sufficient to overcome the snap ring force of snap ring 98. This force causes snap ring 98 to bear against the ramps of ramp sided groove 114. This cause the snap ring to expand and be forced out of ramp sided groove 114. This then allows fitting 94 to move relative to release collar 96. Once moved, ball bearings 100 and holes 112 become aligned with clearance grooves 118. Clearance grooves 118 allow ball bearings 100 to move out of engagement with grooves 110, freeing barb 92 from engagement with fitting 94.

In an exemplary embodiment shown in FIGS. 15 and 16, the above described safety system is fitted within a breakaway system 90, so that upon a breakaway/release condition, the safety system is activated, shutting off fluid flow by seating of the valve bodies in the valve seats. In such a breakaway system, one or more connectors, such as multipoint connector 46 may be designed to allow separation from cable 48 or links 42/44 after enough force has been exerted to seat valve bodies 26/28 in valve seats 57/59. This would prevent further damage from pulling on the destination/source equipment, while still cutting off fluid flow. A condition that can cause such a breakaway condition is a container truck driving away with a transfer hose still attached to the fill/delivery station and the truck. When safety system 10 and breakaway system 90 are used a hose 50, containment of pressurized fluid is achieved at both ends during a breakaway failure condition. Breakaway system 90 may be used on one or both ends of a hose 50, but will generally be used on one end.

FIGS. 17–20 show a fluid gas conduit safety system 200 using a pivotally connected, single valve body in each of the end fittings assemblies to effectuate the seal enclosure in the event of hose failure during fluid flow.

In FIG. 17, a connector end 210 is shown. Connector end 210 is an end fitting assembly for one end of a fluid/gas conduit safety system 200. Connector end 210 is comprised of a body or housing 216. Body 216 serves as the end fitting of the end fitting assembly 210. Body 216 has first and second openings or apertures with an internal cavity disposed therebetween.

A valve 218 is shown contained in the internal cavity within body 216. Valve 218 seats with valve seat 232 to form a seal during a failure or closure condition. Valve 218 includes an O-ring 220 which encircles a valve body 219. The outer edge of O-ring 220 is a valve sealing surface 230 which makes a sealable connection with valve seat 232. Valve 218 also includes a valve leg 226 which extends from the back or non-sealing side of valve 218. Valve leg 226 is attached to body 216 via hinge pin 228 and hinge pin plug 242. Valve leg 226 is attached to body 216 in a recess or cavity 244 to reduce interference with fluid flow by valve 218. Attached to the front or sealing side of 218 is valve arm 238. Valve arm 238 is attached to a first end of connector 234 via connector pin 236. A second end of connector 234 is attached to internal cable 214. Valve leg 226 and valve arm 238 are extensions that extend from valve body 219.

Valve 218 is shown in the rest position in FIG. 17. In the rest position, valve 218 rests against rest point 224 to minimize impeding fluid flow. Valve 218 is shown in the open or fluid flow condition in FIG. 17.

While threads 240 are shown for body 216, other connection means for the hose will be understood by those skilled in the art. One example of another connection means is a bayonet type closure. Also, body 216 is shown contained within hose 212. Means for securing hose 212 and body 216 will also be understood by those skilled in the art, or previously described therein.

In FIG. 18, connector end 210 is shown with valve 218 in a closed position. The closed position occurs when a hose failure or other failure condition, such as those previously described, takes place. In the closed position, valve sealing surface 230 contacts O-ring 220 contacts valve seat 232, forming a seal. In this state, valve 218 has pivoted about hinge pin 228, rotating valve 218 into the closed position. Valve 218 is maintained in the closed position by the pressure exerted from the fluid/gas against the back or non-sealing side of valve 218. Additional sealing force may be provided by cable 214 pulling on valve 218 through connector 234 and hinge pin 236. Fluid conduit or hose 212 may be flexible, or non-flexible, upon the application.

There is shown in FIG. 19, a complete fluid/gas conduit safety system 200 with the valves in an open or fluid flow condition. Fluid/gas conduit safety system 200 includes a hose 212 attached to a pair of connector ends 210a and 210b with an internal cable 214 attached to connectors 234a and 234b respectively. In FIGS. 19 and 20, the letters "a" and "b" are used to differentiate between the two end fitting assemblies that are located at either end of hose 212. Each of these connector ends 210 has identical components.

Fluid/gas conduit safety system 200 is shown with a flexible internal cable 214 in a serpentine state. Internal cable 214 has sufficient force to maintain valve 218a and 218b in their opened conditions to allow fluid flow therethrough. Upon a failure condition such a stretching or rupture, internal cable 214 no longer maintains valve 218a and 218b in the open condition. This may arise from pulling the valves into a closed position or allowing the valves to close by virtue of the pressure exerted from the respective sides by removing the spring force of internal cable 214 that is holding valves 218a and 218b in place. Removing the spring force can occur through a rupture in hose 212 or a severing of cable 214. In an exemplary embodiment, internal cable 214 is a valve control means for maintaining the valves in the open position. Other embodiments, such as the pressurized tube described above can be used as the valve control means for maintaining the valves in an open position during normal (non-failure) operation.

FIG. 20 shows an example of a broken hose condition with valves 218a and 218b in the seated or seated (sealed) position. In the example shown in FIG. 20, cable 214 has become taut because of a severing of hose 212, pulling valves 218a and 218b into the seated position.

Additional embodiments can be derived from combining the features and embodiments described herein to address particular applications and conditions.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A safety system for a fluid conduit comprising:
   a fluid conduit having first and second ends;
   a first housing connected to said first end of said fluid conduit, said first housing having first and second openings and an internal cavity, therebetween and a first connection point inside said internal cavity,
   a second housing connected to said second end of said fluid conduit, said second housing having first and second openings and an internal cavity, therebetween and a second connection point inside said internal cavity;
   a first valve seat disposed in said first housing and a second valve seat disposed in said second housing, said first and second valve seats positioned a first predetermined distance from each other;
   a first valve body pivotally attached to said first housing at said first connection point and a second valve body pivotally attached to said second housing at said second connection point, said first and second valve seats disposed between said first and second plurality of valve bodies and said internal cavity of said first housing further comprises a first recess for retaining said first valve body during an open flow condition substantially out of the flow path of said fluid; and
   valve control means for retaining said first and second valve bodies from said first and second valve seats, respectively, during an open fluid flow condition, and pivotally seating one or more of said first and second valve bodies with said first and second valve seats, respectively, during a fluid conduit failure.

2. A safety system for a fluid conduit in accordance with claim 1, wherein said valve control means comprises a pressurized tube.

3. A safety system for a fluid conduit in accordance with claim 2, wherein said pressurized tube is attached to said first and second valve bodies.

4. A safety system for a fluid conduit in accordance with claim 3, wherein said hose and said pressurized tube each have a respective length and said length of said pressurized tube is substantially the same length of said hose.

5. A safety system for a fluid conduit comprising:
   a fluid conduit having first and second ends;
   a first housing connected to said first end of said fluid conduit, said first housing having first and second openings and an internal cavity, therebetween and a first connection point inside said internal cavity;
   a second housing connected to said second end of said fluid conduit, said second housing having first and second openings and an internal cavity, therebetween and a second connection point inside said internal cavity;
   a first valve seat disposed in said first housing and a second valve seat disposed in said second housing, said first and second valve seats positioned a first predetermined distance from each other;

a first valve body pivotally attached to said first housing at said first connection point said first valve body comprised of a main body having first and second extensions therefrom, said first extension pivotally attached to said connection point and said second extension attached to said retaining means and a sealable surface for sealably engaging said first valve seat when said first valve body seats with said first valve seat, a second valve body pivotally attached to said second housing at said second connection point, said first and second valve seats disposed between said first and second plurality of valve bodies; and valve control means for retaining said first and second valve bodies from said first and second valve seats, respectively, during an open fluid flow condition, and pivotally seating one or more of said first and second valve bodies with said first and second valve seats, respectively, during a fluid conduit failure.

6. A safety system for a fluid conduit comprising:

a fluid conduit having first and second ends;

a first housing connected to said first end of said fluid conduit, said first housing having first and second openings and an internal cavity, therebetween and a first connection point inside said internal cavity;

a second housing connected to said second end of said fluid conduit, said second housing having first and second openings and an internal cavity, therebetween and a second connection point inside said internal cavity;

a first valve seat disposed in said first housing and a second valve seat disposed in said second housing, said first and second valve seats positioned a first predetermined distance from each other;

a first valve body pivotally attached to said first housing at said first connection point and a second valve body pivotally attached to said second housing at said second connection point, said first and second valve seats disposed between said first and second plurality of valve bodies; and a flexible yet substantially rigid cable for retaining said first and second valve bodies from said first and second valve seats, respectively, during an open fluid flow condition, and pivotally seating one or more of said first and second valve bodies with said first and second valve seats, respectively, during a fluid conduit failure.

7. A safety system for a fluid conduit in accordance with claim 6, wherein said flexible yet substantially rigid cable is attached to said first and second valve bodies.

8. A safety system for a fluid conduit in accordance with claim 7, wherein said flexible fluid conduit and said and substantially rigid cable each have a respective length and said length of said substantially rigid cable is longer than said length of said flexible fluid conduit.

9. A safety system for a fluid conduit in accordance with claim 8, wherein said substantially rigid cable is positioned within said flexible fluid conduit in a substantially serpentine position.

10. A safety system for a fluid conduit comprising:

a hose having first and second ends;

a first housing containing a valve seat disposed at said first end of said hose and a second housing containing a second valve seat disposed at said second end of said hose, said first and second valve seats positioned a first predetermined distance from each other;

a first valve body disposed within and pivotally attached to said first housing and a second valve body disposed within and pivotally attached to said second housing, said first and second valve seats disposed between said first and second valve bodies, said first and second valve bodies positioned a second predetermined distance from said first and second valve seats, respectively;

a flexible yet substantially rigid cable having first and second cable ends, positioned within said hose, said first cable end connected to said first valve body and said second cable end connected to said second valve body, said cable retaining said first and second valve bodies said second predetermined distance from said first and second valve seats, respectively, during an open flow condition, and seating one or both of said first and second valve bodies with said first and second valve seats, respectively, during a hose failure.

11. A safety system in accordance with claim 10 wherein said first housing is connected to said first end of said hose, said first housing having first and second openings and an internal cavity, therebetween and a first connection point inside said internal cavity.

12. A safety system in accordance with claim 11 wherein said second housing is connected to said second end of said hose, said second housing having first and second openings and an internal cavity, therebetween and a second connection point inside said internal cavity.

13. A safety system for a fluid conduit in accordance with claim 12, wherein said internal cavity of said first housing further comprises a first recess for retaining said first valve body during an open flow condition substantially out of the flow path of said fluid.

14. A safety system for a fluid conduit in accordance with claim 12, wherein said internal cavity of said second housing further comprises a second recess for retaining said second valve body during an open flow condition substantially out of the flow path of said fluid.

15. A safety system for a fluid conduit in accordance with claim 12, wherein said first valve body is comprised of a main body having first and second extensions therefrom, said first extension pivotally attached to said second connection point and said second extension attached to said retaining means and a sealable surface for sealably engaging said second valve seat when said second valve body seats with said second valve seat.

* * * * *